United States Patent
Viswanathan (10) Patent No.: US 9,100,978 B2
(45) Date of Patent: Aug. 4, 2015

(54) METHOD AND APPARATUS FOR ALLOCATING RESOURCES OF A FREQUENCY BAND IN A WIRELESS SYSTEM SUPPORTING AT LEAST TWO RADIO ACCESS TECHNOLOGIES

(75) Inventor: Harish Viswanathan, Morristown, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 401 days.

(21) Appl. No.: 13/399,499

(22) Filed: Feb. 17, 2012

(65) Prior Publication Data
US 2013/0208664 A1 Aug. 15, 2013

Related U.S. Application Data

(60) Provisional application No. 61/598,993, filed on Feb. 15, 2012.

(51) Int. Cl.
| | |
|---|---|
| *H04W 72/04* | (2009.01) |
| *H04W 72/12* | (2009.01) |
| *H04W 52/24* | (2009.01) |
| *H04L 5/00* | (2006.01) |
| *H04L 27/00* | (2006.01) |
| *H04W 4/00* | (2009.01) |
| *H04W 88/10* | (2009.01) |

(Continued)

(52) U.S. Cl.
CPC ......... *H04W 72/1215* (2013.01); *H04L 5/0028* (2013.01); *H04L 27/0006* (2013.01); *H04W 52/243* (2013.01); *H04L 5/0053* (2013.01); *H04L 5/0064* (2013.01); *H04L 5/0087* (2013.01); *H04W 4/005* (2013.01); *H04W 52/04* (2013.01); *H04W 52/143* (2013.01); *H04W 72/0453* (2013.01); *H04W 88/10* (2013.01)

(58) Field of Classification Search
None
See application file for complete search history.

(56) References Cited

U.S. PATENT DOCUMENTS

| | | |
|---|---|---|
| 2007/0149187 A1 | 6/2007 | Levy |
| 2008/0192622 A1* | 8/2008 | Scheim et al. ............... 370/210 |

(Continued)

FOREIGN PATENT DOCUMENTS

| | | |
|---|---|---|
| EP | 2403306 | 1/2012 |
| WO | WO-2008081309 A2 | 7/2008 |
| WO | WO 2009/126598 | 10/2009 |
| WO | WO 2010/025279 | 3/2010 |

OTHER PUBLICATIONS

International Search Report and Written Opinion mailed Jun. 3, 2013 in corresponding PCT International Application No. PCT/US2013/025520 filed Feb. 11, 2013.

(Continued)

*Primary Examiner* — Chi H Pham
*Assistant Examiner* — Shick Hom
(74) *Attorney, Agent, or Firm* — Harness, Dickey & Pierce, P.L.C.

(57) ABSTRACT

In one embodiment, the method for allocating resources in a wireless system supporting a first radio access technology (RAT) and a second RAT operating in a narrower frequency band than the first RAT includes assigning at least one physical resource block (PRB) of a plurality of PRBs of the frequency band to the second RAT. The method further includes transmitting, in a first sector, over the at least one assigned PRB using the second RAT. The method further includes transmitting, in the first sector, control signals on unassigned PRBs using the first RAT.

18 Claims, 9 Drawing Sheets

(51) Int. Cl.
 H04W 52/14 (2009.01)
 H04W 52/04 (2009.01)

(56) References Cited

U.S. PATENT DOCUMENTS

| | | | |
|---|---|---|---|
| 2008/0305775 | A1 | 12/2008 | Aaltonen et al. |
| 2010/0054161 | A1 | 3/2010 | Montojo et al. |
| 2011/0044218 | A1* | 2/2011 | Kaur et al. ............. 370/310 |
| 2011/0077015 | A1 | 3/2011 | Saily et al. |
| 2011/0230219 | A1* | 9/2011 | Shores et al. ............. 455/507 |
| 2012/0207067 | A1* | 8/2012 | Malladi et al. ............. 370/281 |
| 2012/0327867 | A1* | 12/2012 | Kela et al. ............. 370/329 |
| 2013/0114447 | A1 | 5/2013 | Luo et al. |
| 2013/0143550 | A1 | 6/2013 | Ostrup et al. |

OTHER PUBLICATIONS

"Cisco visual networking index: Global mobile data traffic forecast update, 2011-2016," *white paper*, Feb. 2012.

Qualcomm, "LTE advanced: Heterogeneous networks," *white paper*, Jan. 2011.

T. X. Brown, "Cellular performance bounds via shotgun cellular systems," *IEEE Journal on Selected Areas in Communications*, vol. 18, No. 11, pp. 2443-2455, 2000.

J. G. Andrews, F. Baccelli, and R. Ganti, "A tractable approach to coverage and rate in cellular networks," *IEEE Transactions on Communications*, vol. 59, No. 11, pp. 3122-3134, Nov. 2011.

3GPP, "Evolved universal terrestrial radio access (E-UTRA); physical channels and modulation," *3GPP TS 36.211 V10.5.0*, Jun. 2012.

Soroush Ghamari et al.: "An approach for automated spectrum refarming for multiple radio access technologies", Telecom World (ITU WT), 2011 Technical Symposium at ITU, IEEE; Oct. 24, 2011; pp. 187-192, XP032070408.

Taiwanese Office Action dated Jul. 30, 2014 in corresponding Taiwanese Application No. 102105333.

Office Action dated Oct. 28, 2014 in related U.S. Appl. No. 13/727,805.

* cited by examiner

METHOD AND APPARATUS FOR ALLOCATING RESOURCES OF A FREQUENCY BAND IN A WIRELESS SYSTEM SUPPORTING AT LEAST TWO RADIO ACCESS TECHNOLOGIES

This application claims priority under 35 U.S.C. §119(e) to U.S. Provisional Application No. 61/598,993, filed on Feb. 15, 2012, the entire contents of each of which are hereby incorporated herein by reference.

BACKGROUND

General Packet Radio Service (GPRS) is widely used for cellular machine-to-machine (M2M) devices. The cost of GPRS continues to decline over time, making GPRS more attractive to M2M providers. Furthermore, because GPRS is available worldwide, a single technology device based on GPRS can be used for applications deployed internationally. While GPRS may not allow a high level of data transmission, GPRS remains suitable for M2M because most M2M devices require very low data rates for communication.

Explosive data growth is resulting in a spectrum crunch and thus many mobile network operators (MNOs) are studying ways to refarm their 2G spectrum to the more efficient 3G/LTE. However, refarming is complicated in that MNOs must support numerous legacy M2M devices. M2M devices, for example smart meters, typically have long life cycles, and it is expensive to migrate these devices to 3G/LTE because such migration requires a service crew to be dispatched to the site where a device is deployed. Despite this, MNOs require that their 2G M2M customers migrate to 3G/LTE so that MNOs can refarm the spectrum.

SUMMARY

Embodiments relate to a method and/or apparatus for allocating resources in a wireless system supporting a first radio access technology (RAT) and a second RAT that operates over a narrower frequency band than the first RAT.

In one embodiment, the method for allocating resources in a wireless system supporting a first radio access technology (RAT) and a second RAT operating in a narrower frequency band than the first RAT includes assigning at least one physical resource block (PRB) of a plurality of PRBs of the frequency band to the second RAT. The method further includes transmitting, in a first sector, over the at least one assigned PRB using the second RAT. The method further includes transmitting, in the first sector, control signals on unassigned PRBs using the first RAT.

The method may further include reducing transmission power on the at least one of the unassigned PRBs using the first RAT if the unassigned PRB is close to an assigned PRB.

The method may further include determining that an assigned PRB is not being used for transmission using the second RAT. The method may further include transmitting over the assigned PRB using the first RAT based on the determining.

In one embodiment, the determining is based on traffic conditions of the network.

In one embodiment, the determining is based on the time of day.

In one embodiment, the assigning may further include determining at least one protected channel of the first RAT. The method may further include assigning the at least one PRB such that the at least one PRB does not include the at least one protected channel.

In one embodiment, the at least one protected channel is a synchronization channel.

In one embodiment, the at least one protected channel is a control channel.

In one embodiment, the assigned PRB in the first sector is not used for transmission in a second sector.

The method may further include transmitting at low power, in a second sector, over the at least one assigned PRB using the first RAT.

In one embodiment, the transmitting at low power transmits to a user equipment that is close to a base station of the second sector.

In one embodiment, the method for allocating resources of a frequency band in a wireless system support a first radio access technology (RAT) and a second RAT operating in a narrower frequency band than the first RAT includes assigning at least one physical resource block (PRB) of a plurality of PRBs of the frequency band to the second RAT, the at least one assigned PRB not including a control channel of the first RAT. The method further includes transmitting, in a first sector, over the at least one assigned PRB using the second RAT.

The method may further include transmitting, in the first sector, data signals on unassigned PRBs using the first RAT. The method may further include reducing transmission power of the control signals and the data signals on an unassigned PRB using the first RAT if the unassigned PRB is close to an assigned PRB.

The method may further include determining that the at least one assigned PRB is not used for transmission using the second RAT. The method may further include transmitting over the at least one assigned PRB using the first RAT based on the determining.

In one embodiment, the determining is based on a reduction in the number of devices using the second RAT.

In one embodiment, the assigned PRB in the first sector is not used for transmission in the second sector.

The method may further include transmitting at low power, in a second sector, over the at least one assigned PRB using the first RAT.

In one embodiment, the transmitting at low power transmits to a user equipment that is close to a base station of the second sector.

In one embodiment, an apparatus for allocating carrier frequencies of a frequency band in a wireless system supporting a first radio access technology (RAT) and a second RAT operating in a narrower frequency band than the first RAT includes a controller. The controller is configured to assign at least one physical resource block (PRB) of a plurality of PRBs of the frequency band. The controller is further configured to transmit, in a first sector, using only the second RAT in the at least one reserved PRB. The controller is further configured to transmit, in the first sector, control signals on unassigned PRBs using the first RAT.

In one embodiment, an apparatus for allocating carrier frequencies of a frequency band in a wireless system supporting a first radio access technology (RAT) and a second RAT operating in a narrower frequency band than the first RAT includes a controller. The controller is configured to assign at least one physical resource block (PRB) of a plurality of PRBs of the frequency band to the second RAT, the at least one assigned PRB not including a control channel of the first RAT. The controller is further configured to transmit in a first sector using only the second RAT in the at least one assigned PRB.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Various embodiments of the present disclosure will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); and $3^{rd}$ Generation Partnership Project Long Term Evolution (3GPP LTE).

Devices in a wireless network may communicate using different Radio Access Technologies (RATs). A first RAT may require relatively broad frequency bands for operation, when compared to other RATS. Other RATS may require relatively narrow frequency bands for operation. An example of a RAT that requires a relatively narrow frequency band for operations is GPRS. Hereinafter, in the interest of brevity, the second RAT may be referred to as RAT 2, or the narrowband RAT.

In one embodiment, a base station reserves certain physical resource blocks (PRBs) within the 10 MHZ LTE deployment for GPRS. Sub-carriers corresponding to the reserved PRBs are not used by the base station for transmission of any LTE signal. Rather, only GPRS signals are transmitted on that sub-carrier from a given base station.

In example embodiments, a base station reserves PRBs for GPRS such that the LTE control or signaling PRBs, used for synchronization, control signaling and other signaling such as HARQ feedback, are not assigned to GPRS. Using this approach, LTE UEs are not impacted by GPRS transmissions.

The adjacent channel leakage ratio of GPRS generates interference such that the Signal to Interference plus Noise Ratio (SINR) of neighboring LTE PRBs will be limited to an average of about 10 dB. However, this limitation does not significantly impact overall LTE spectral efficiency because LTE UEs close to the cell edge have a SINR limited to less than 1 dB due to out-of-cell interference.

On the other hand, GPRS terminals that are far from the cell edge, or relatively closer to the eNodeB, will cause great interference to LTE UEs in adjacent PRBs. As is known, GPRS power control is relatively crude compared to LTE power control. Therefore, LTE closed-loop power control may be used to overcome GPRS interference.

To mitigate interference from LTE PRBs to GPRS, transmit power on the PRBs close to GPRS PRBs can be reduced and in addition interference mitigation through pre-coding can be used. Pre-coding means transmitting a linear combination of signals sent on the LTE PRBs on the GPRS PRBs so that the effects of LTE PRB transmissions are effectively nullified in the GPRS PRBs.

Further, GPRS employs frequency reuse. Spectral efficiency can be improved by allowing low-power LTE transmissions to LTE UEs close to the base station on the GPRS PRBs of the neighboring cells/sectors. With this fractional reuse approach between LTE and GPRS, the amount of spectrum needed to support GPRS can be minimized. With the above techniques an overlay can be supported efficiently.

Figure 1:
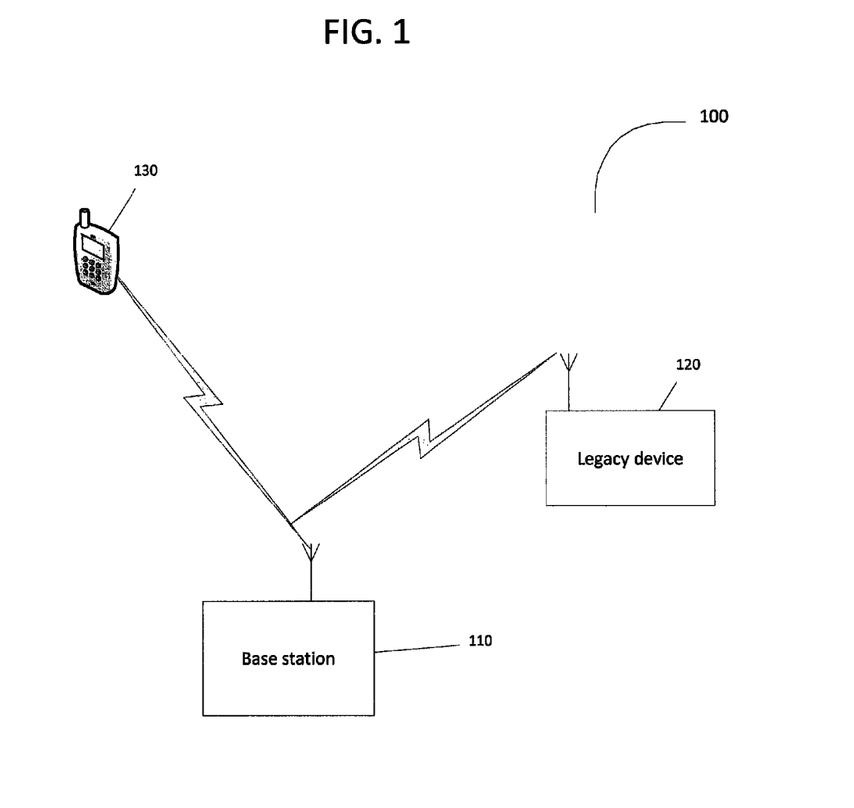
FIG. 1 illustrates a system in which example embodiments are implemented.

FIG. 1 illustrates a system in which example embodiments are implemented.

Referring to FIG. 1, the system 100 includes at least one base station 110. The base station 110 may be an LTE eNodeB. The base station 110 may incorporate a controller supporting GPRS technologies. The controller may be a base station controller. A base station 110 according to one example embodiment is described in further detail with respect to FIG. 2 below.

The base station 110 serves a geographical region. It should be understood that, while the system 100 depicts only one base station 110, there may be additional, adjacent base stations serving adjacent geographic regions.

The system 100 may include one or more LTE devices 130. The LTE devices 130 may operate using a RAT that requires a relatively broad frequency spectrum. The system may further include one or more legacy devices 120 that operate using a narrowband RAT.

It should be understood that at any point in time there may be no LTE devices 130 or legacy devices 120 served by the base station 110. It should further be understood that at any given point in time all devices served by the base station 110 may be LTE devices 130 or alternatively all devices served by the base station 110 may be legacy devices 120.

The legacy devices 120 may be machine-to-machine (M2M) devices. The M2M devices may be, for example, smart meters. The devices 120 may be in communication with each other or to an application running on, for example, the Internet. using the narrowband RAT. The narrowband RAT may be, for example, GPRS.

Figure 2:
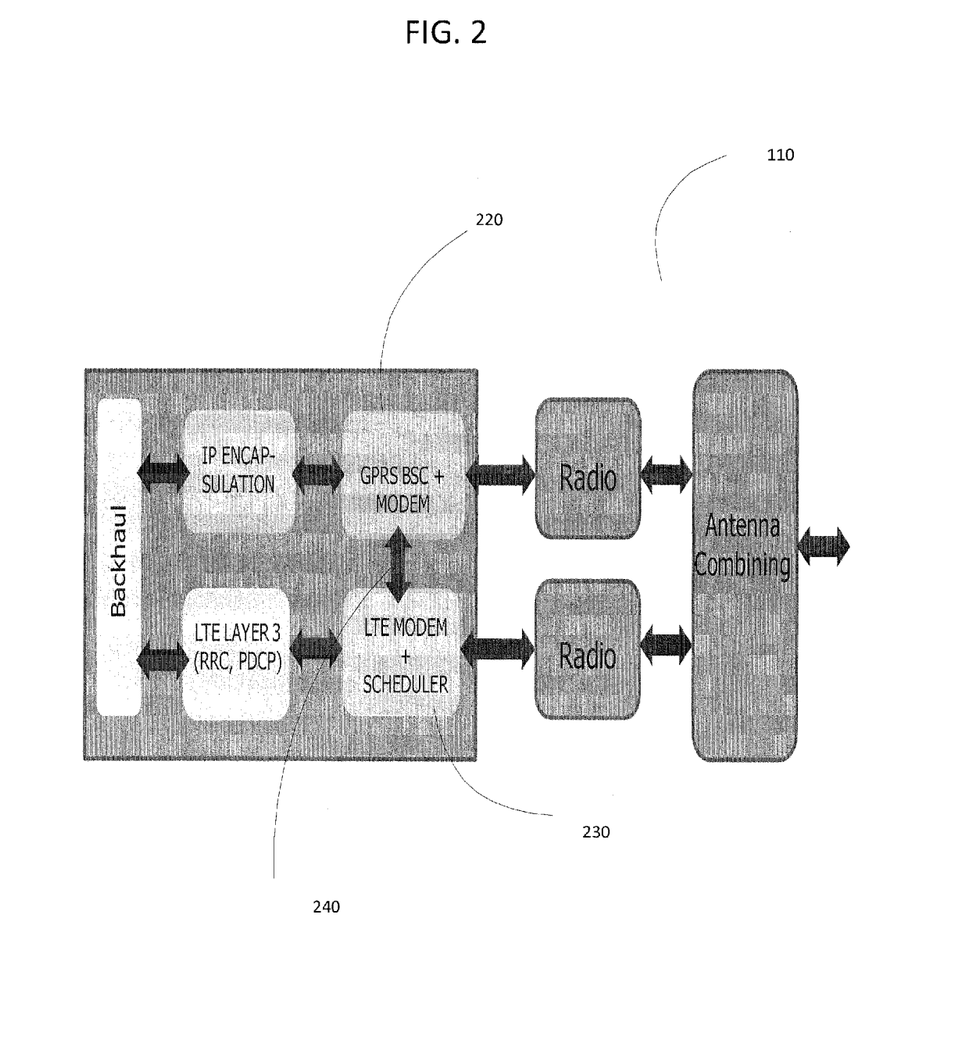
FIG. 2 illustrates a base station in the system in which example embodiments are implemented.

FIG. 2 illustrates a base station 110 according to an example embodiment. It should be understood that the base station 110 may include other components not illustrated in FIG. 2. In an example embodiment, the base station 110 is an LTE eNodeB. The LTE eNodeB incorporates a GPRS base station controller (BSC) 220. The LTE eNodeB includes a Backhaul for connecting to a core network (CN). The Backhaul feeds data to an LTE Layer 3 and LTE Modem and Scheduler 230. As is known, the LTE Layer 3 handles service connection protocols such as Radio Resource Control (RRC) protocol and Packet Data Convergence Protocol (PDCP). As LTE Layer 3 is a known element of an LTE eNodeB, further description is omitted in the interest of brevity.

In example embodiments, the LTE Scheduler and Modem 230 is in communication 240 with GPRS BSC 220. The LTE Scheduler and Modem 230 coordinates with GPRS BSC 220 for scheduling PRBs.

Figure 3:
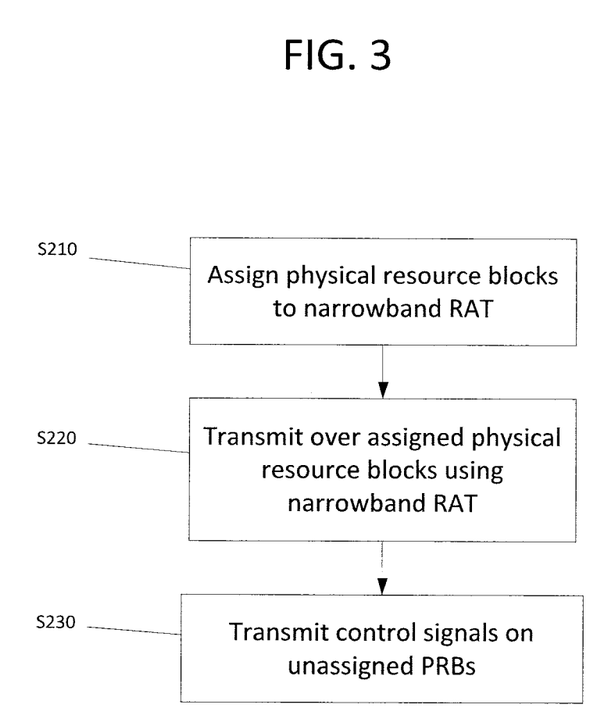
FIG. 3 illustrates a method of allocating resources of a frequency spectrum according to an example embodiment.

FIG. 3 illustrates a method of allocating resources of a frequency band in a wireless system supporting a first radio access technology and a second RAT. For example, the first RAT may be 3G/LTE and the second RAT may be GPRS. As described above, the second RAT may operate using a narrower frequency band than the first RAT.

In step S210, the base station 110 assigns at least one physical resource block (PRB) of the LTE spectrum to the second RAT. It should be understood that the base station 110 may assign one or several PRBs to the second RAT. It will be understood that some RATS require a minimum of two PRBs. It should further be understood that GPRS transmission requires at least one Signaling/Broadcast Control /Channel (BCCH) carrier and at least one traffic carrier in each sector.

In step S220, base station 110 transmits on the downlink to legacy devices 120, over the PRBs that have been assigned to the second RAT. It should be understood that uplink transmissions may also occur over assigned PRBs in a separate frequency band, as is known with Frequency Division Duplex (FDD) technologies. The PRBs assigned to the second RAT for downlink communications may be in the same or different locations within a frequency band as the PRBs assigned to the second RAT for uplink communications. The uplink transmissions may be transmissions from legacy devices 120. Legacy devices 120 may be, for example, M2M devices.

In step S230, the base station 110 transmits on the downlink over the non-assigned PRBs. The non-assigned PRBs include control and/or synchronization channels of LTE.

In example embodiments, transmission power may be reduced on the PRBs that have not been reserved for second RAT use. The base station 110 may reduce transmission power when the PRB is relatively close to a PRB that has been reserved for GPRS. For example, the base station 110 may reduce transmission power when the PRB is within one to three PRBs from a PRB that has been reserved for GPRS. The base station 110 may achieve transmission power reduction through power shaping of LTE transmissions, or through pre-coding algorithms. The transmission power reduction by the base station 110 is capable of meeting interference requirements for GPRS, downlink LTE transmissions.

Figure 4:
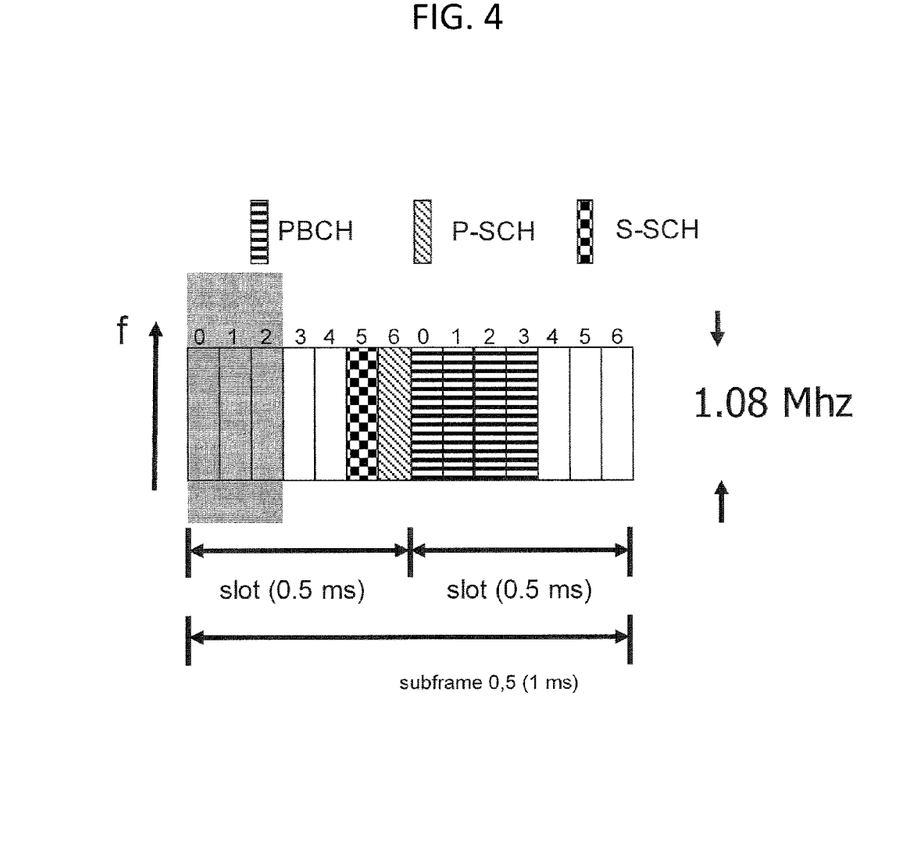
FIGS. 4-5 illustrate the impact of frequency allocations on downlink LTE communications according to an example embodiment.
Figure 5:
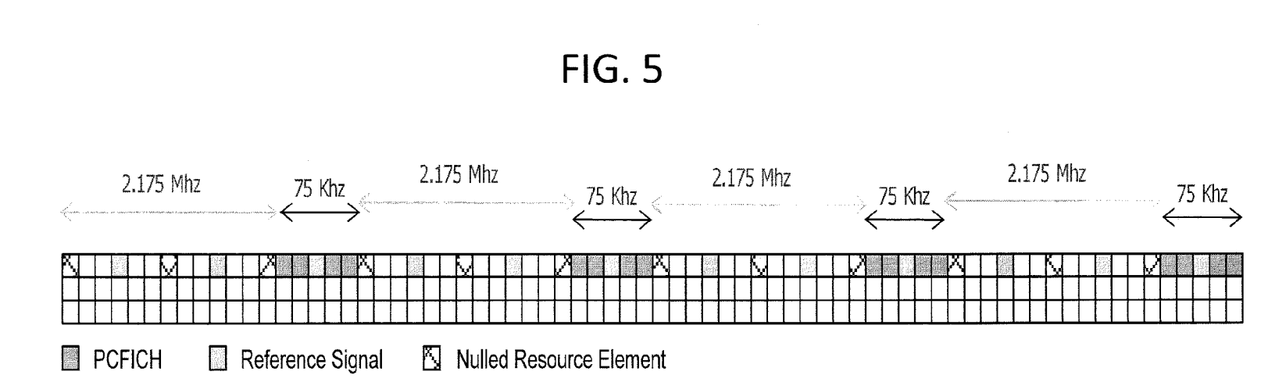

FIGS. 4-5 illustrate that LTE downlink communications remain unaffected by frequency allocations described in example embodiments.

With reference to FIG. 4, no impact is seen on broadcast and synchronization channels when GPRS is transmitted outside of the central 1.08 MHz of the LTE band. The base station 110 transmits using GPRS on the lower three PRBs of the portion of the frequency band depicted in FIG. 4. LTE broadcast and synchronization channels, for example, Secondary Synchronization Channel (S-SCH), Physical Broadcast Channel (PBCH), and Primary Synchronization Channel (P-SCH), remain unaffected.

FIG. 5 illustrates that GPRS impact on protected LTE channels may be avoided by not using certain 75 kHz chunks of the frequency spectrum. The Physical Control Format Indicator Channels (PCFICH) illustrated as the darker squares in FIG. 5, occur at fixed positions in the LTE frequency band. Because the PCFICH occurs at fixed positions, the base station 110 may avoid affecting these channels by avoiding assigning PRBs in these chunks of the frequency spectrum.

The base station 110 may determine these fixed positions of PCFICH channels based on periodically-transmitted reference signals, as shown in FIG. 5. Reference signals, as known in the art, are periodically transmitted signals used for calculating channel impulse response. The base station 110 may calculate the next 75 kHz chunk, based on its transmissions of reference signals interspersed with nulled resource elements as shown in FIG. 5, to avoid assigning GPRS PRBs during those chunks.

Figure 6:
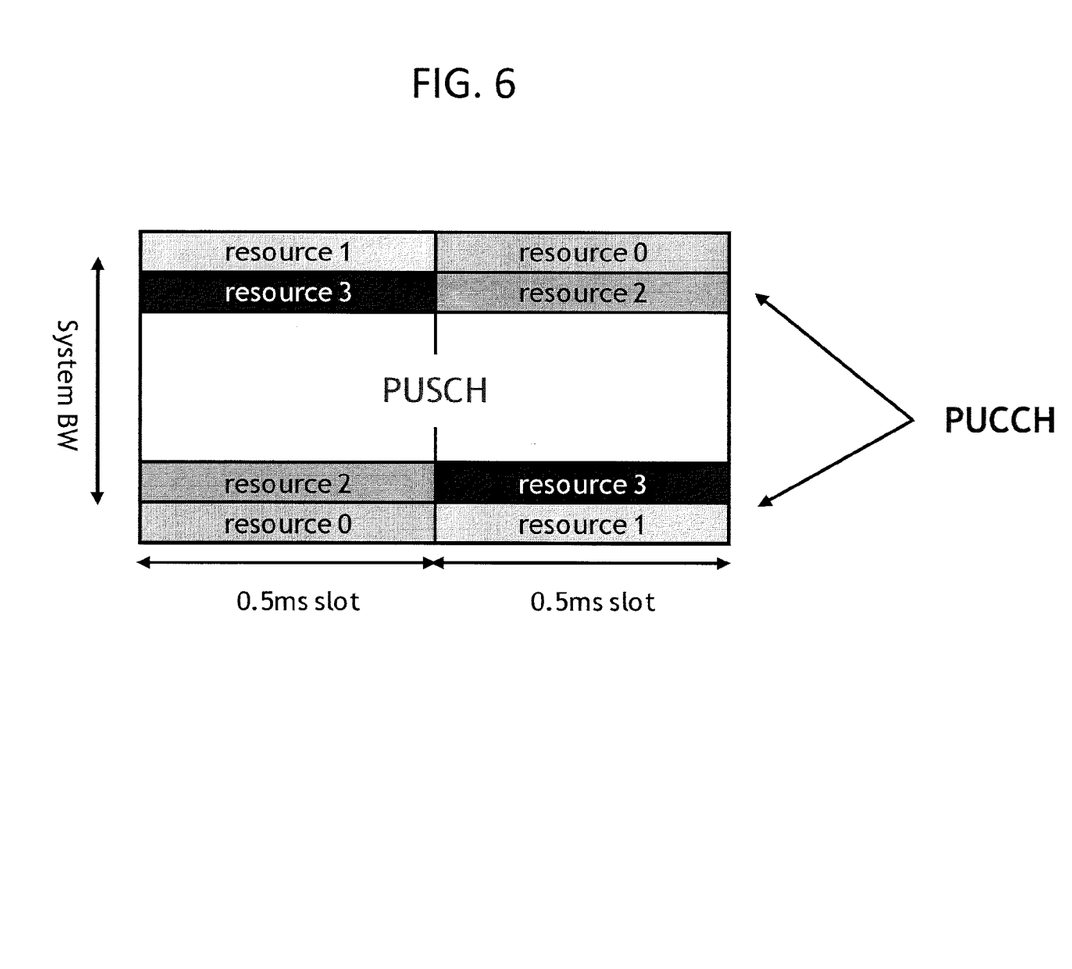
FIGS. 6-7 illustrate the impact of frequency allocations on uplink LTE communications according to an example embodiment.
Figure 7:
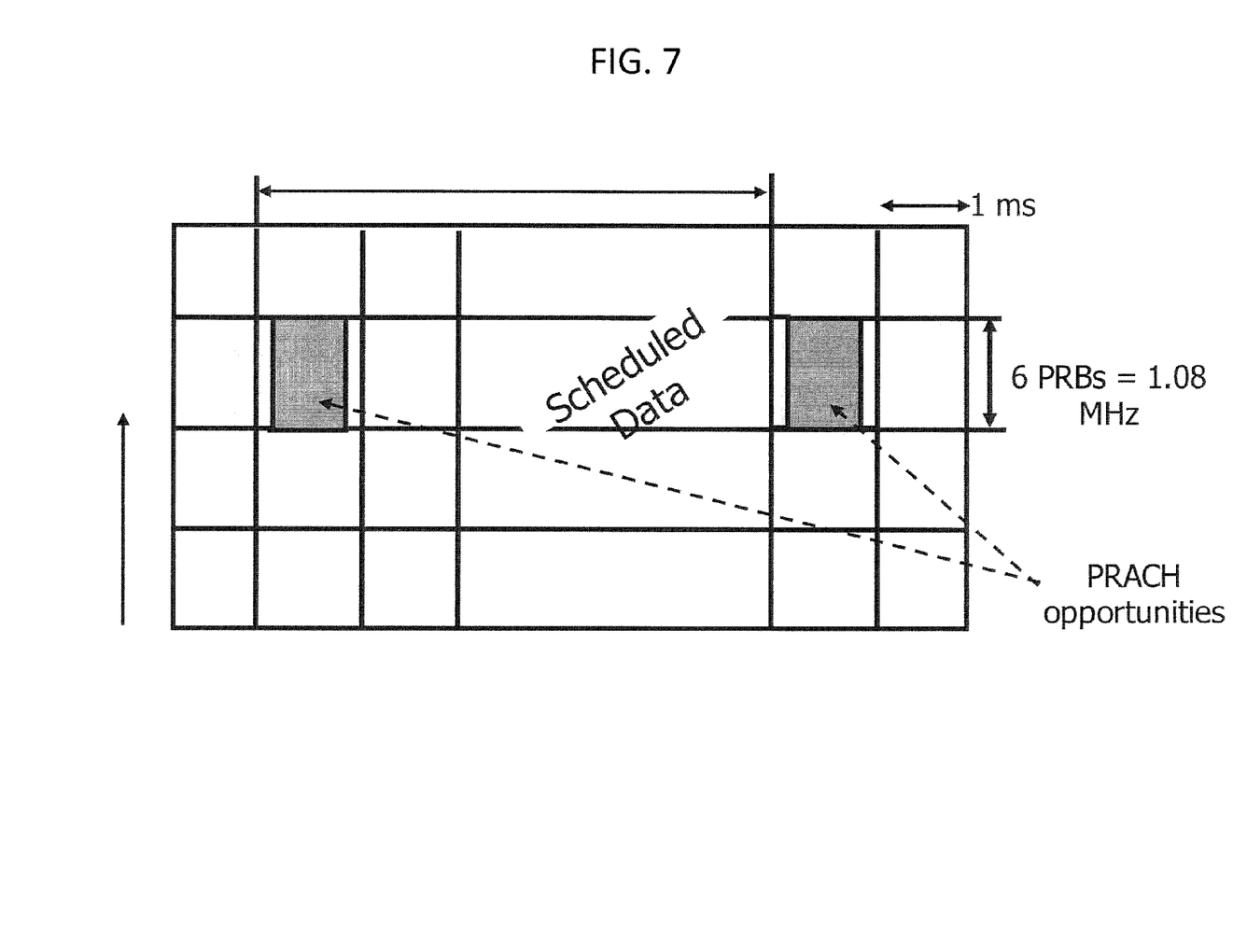

FIGS. 6-7 illustrate that LTE uplink communications remain unaffected by frequency allocations described in example embodiments.

With reference to FIG. 6, uplink control channels are sent on the band edges and can therefore avoid GPRS PRBs. For example, Physical Uplink Control Channels (PUCCH) are sent at the band edges.

With reference to FIG. 7, Physical Random Access Channels (PRACH) are restricted to contiguous bands of 1.08 MHz, which can be assigned to avoid overlapping with GPRS PRBs.

If a management or operation entity determines that PRBs assigned for GPRS use are under-utilized and a smaller number of PRBs is sufficient for GPRS transmissions, then the base station 110 may instead use LTE for transmissions over the unused PRBs. In this way, spectrum sharing and allocation can be dynamic and adaptable to changing needs. An operations or management entity makes the determination of under-utilization, outside the base station 110, in order that uniformity of assignment policies can be enforced over multiple base stations 110. The operations or management entity may provide signals to the base station 110 concerning policies as to which PRBs may be used for the second RAT. For example, the operations or management entity may determine that an assigned PRB is not being used for transmission using the second RAT. Based on this determination, the base station 110 may transmit over the assigned PRB using the first RAT.

The management or operation entity may make this determination by studying traffic conditions in the region and particularly on PRBs assigned for GPRS use. The determination may be made based on the time of day. For example, it may be desirable to have more PRBs assigned to LTEs, during time periods in which human users demand greater bandwidth for their operations. For example, users may perform more web-browsing and video watching during the evening hours, and require greater bandwidth using LTE devices. In addition, during these times, M2M devices may be less active because these devices may typically operate only during regular business hours, or M2M devices may postpone their transmissions to a later time when less bandwidth is required for LTE devices.

Finally, as M2M devices evolve and as more M2M devices migrate to 3G/LTE, there may be less need for PRBs reserved for GPRS, and the PRBs may be dynamically allocated to LTE use to allow for more efficient frequency spectrum use.

In example embodiments, base stations 110 assign PRBs to the second RAT subsequent to determining which channels of the frequency spectrum are protected LTE channels. In this context, protected channels are, for example, LTE control channels or synchronization channels. The base station 110 therefore assigns PRBs to the second RAT such that the PRBs do not include protected LTE channels.

In example embodiments, frequency reuse may be implemented. As described above, frequency reuse means that a base station 110 may assign a PRB for GPRS use in one sector that is not used for transmissions in an adjacent sector. Alternatively, the base station 110 may schedule low-power LTE transmissions in a second sector, on a PRB that was assigned to GPRS in the first sector. Frequency reuse is depicted in FIG. 8.

Figure 8:
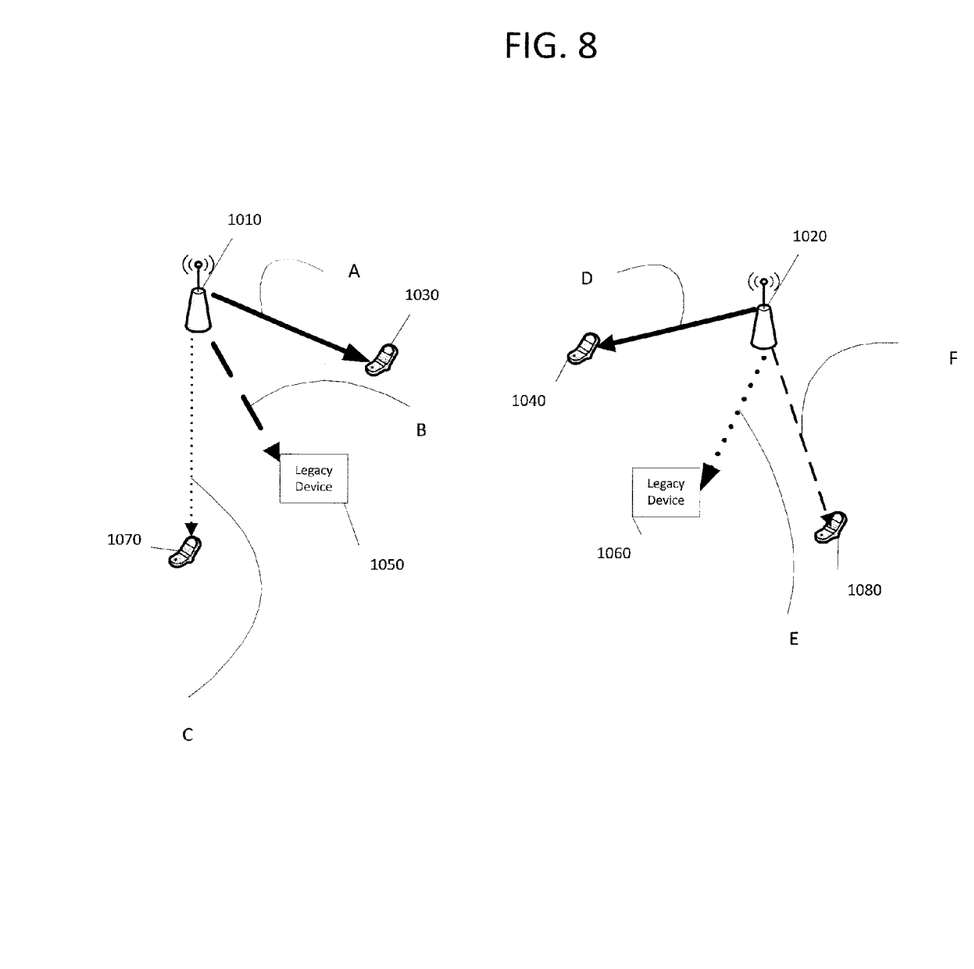
FIG. 8 illustrates frequency reuse according to an example embodiment.

In FIG. 8, two base stations 1010 and 1020 are depicted. Base station 1010 schedules LTE transmissions in PRBs A, and base station 1020 schedules LTE transmissions in PRBs D. Base station 1010 may transmit to one or more LTE devices 1030 on PRBs A, and base station 1020 may transmit to one or more LTE devices 1040 on PRBs D.

With further reference to FIG. 8, base station 1010 may schedule GPRS transmissions in PRBs B and base station 1020 may schedule GPRS transmissions in PRBs E. Base station 1010 may transmit to one or more legacy devices 1050 over PRBs B and base station 1020 may transmit to one or more legacy devices 1060 over PRBs E.

Base station 1010 may schedule low-power transmissions to LTE devices 1070 using PRBs C. PRBs C, in the sector served by base station 1010, are the same PRBs as PRBs E in sector served by base station 1020. Similarly, base station 1020 may schedule low-power transmissions to LTE devices 1080 using PRBs F. PRBs F, in the sector served by base station 1020, are the same PRBs as PRBs B in the sector served by base station 1010. The base stations 1010 and 1020 may use low-power LTE transmissions for LTE devices 1070 and 1080 that are physically close to the base stations in their respective cells or sectors.

Figure 9:
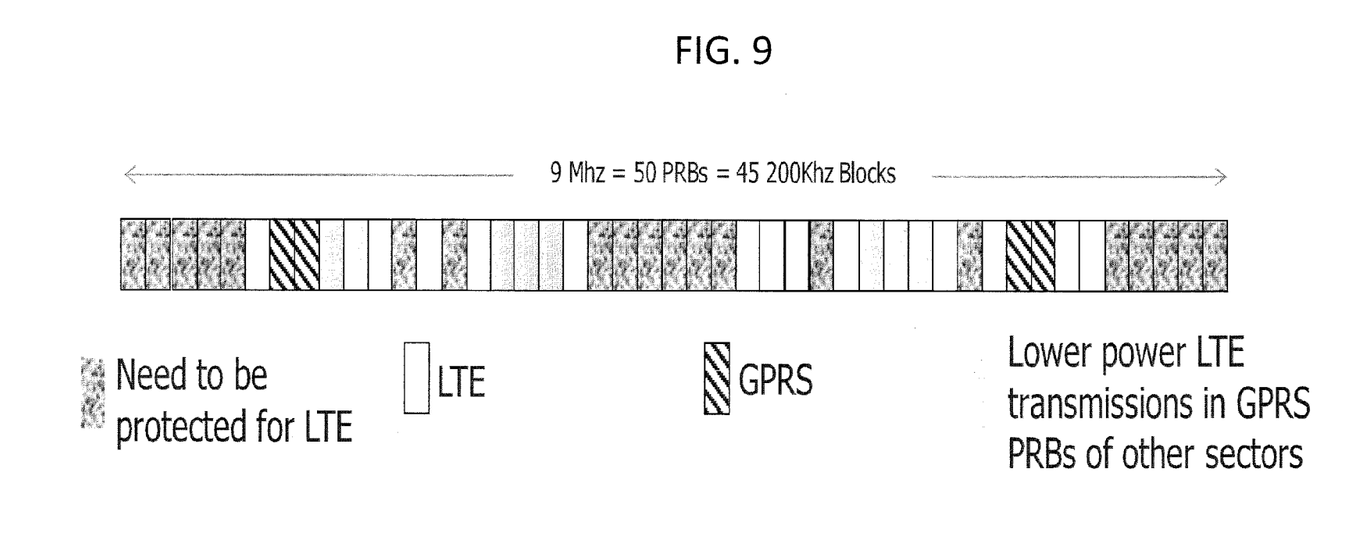
FIG. 9 illustrates an example allocation of GPRS spectrum with LTE according to an example embodiment.

FIG. 9 shows an example allocation of GPRS spectrum with LTE. Each block in the figure represents 200 Khz, the width of a GPRS carrier. A total of 12 200 KHz blocks or about 2.4 MHZ of spectrum can assigned as default GPRS spectrum. This represents about 25% of the LTE spectrum. Each sector can have a BCCH carrier and a traffic carrier. A frequency reuse of ⅗ can be supported for BCCH and ⅓ for traffic channel. As an alternative to frequency hopping, antenna selection diversity can be employed where the signal is transmitted on different antennas in alternate slots to provide diversity transmission. FIG. 5 shows that some of the GPRS blocks meant for use in other cells can be used in this cell for LTE with low power so that they do not cause interference to other cells. The grey blocks cannot be assigned to GPRS since they are protected for LTE control signaling.

In example embodiments, MNOs may continue to offer global M2M service using low cost GPRS modules. MNOs can refarm spectrums from 2G to LTE without requiring that M2M devices migrate to LTE because example embodiments allow M2M devices to transmit on the LTE spectrum using reserved PRBs, without adverse effects to LTE transmissions.

While example embodiments have been described with reference to LTE and GPRS as the first or second RAT, it should be understood that other example embodiments may utilize other RATS as the first or second RAT.

Variations of the example embodiments are not to be regarded as a departure from the spirit and scope of the example embodiments, and all such variations as would be apparent to one skilled in the art are intended to be included within the scope of this disclosure.

What is claimed:

1. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT; and
    transmitting, in a first sector, over the at least one assigned PRB using the second RAT; and
    transmitting, in the first sector, control signals on unassigned PRBs using the first RAT; and
    reducing transmission power on at least one of the unassigned PRBs using the first RAT if the unassigned PRB is scheduled for transmission relatively closer to the assigned PRB than other unassigned PRBs.

2. The method of claim 1, further comprising:
    determining that the assigned PRB is not being used for transmission using the second RAT; and
    transmitting over the assigned PRB using the first RAT based on the determining.

3. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT;
    transmitting, in a first sector, over the at least one assigned PRB using the second RAT;
    transmitting, in the first sector, control signals on unassigned PRBs using the first RAT;
    determining whether the assigned PRB is not being used for transmission using the second RAT; and
    transmitting over the assigned PRB using the first RAT based on the determining, and
    wherein the determining is based on traffic conditions on the network.

4. The method of claim 2, wherein the determining is based on the time of day.

5. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT; and
    transmitting, in a first sector, over the at least one assigned PRB using the second RAT; and
    transmitting, in the first sector, control signals on unassigned PRBs using the first RAT,
    wherein the assigning further includes,
        determining at least one protected channel of the first RAT; and
        assigning the at least one PRB such that the at least one PRB does not include the at least one protected channel.

6. The method of claim 5, wherein the at least one protected channel is a synchronization channel.

7. The method of claim 5, wherein the at least one protected channel is a control channel.

8. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT; and
    transmitting, in a first sector, over the at least one assigned PRB using the second RAT; and
    transmitting, in the first sector, control signals on unassigned PRBs using the first RAT,
    wherein the assigned PRB in the first sector is not used for transmission in a second sector.

9. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT;
    transmitting, in a first sector, over the at least one assigned PRB using the second RAT;
    transmitting, in the first sector, control signals on unassigned PRBs using the first RAT;
    transmitting at low power, in a second sector, over the at least one assigned PRB using the first RAT.

10. The method of claim 9, wherein the transmitting at low power transmits to a user equipment that is close to a base station of the second sector.

11. A method for allocating resources of a frequency band in a wireless system supporting a first radio access technology (RAT) and a second RAT operating in a narrower frequency band than the first RAT, the method comprising:
    assigning at least one physical resource block (PRB) of a plurality of PRBs of the frequency band to the second RAT, the at least one assigned PRB not including a control channel of the first RAT;
    transmitting, in a first sector, over the at least one assigned PRB using the second RAT;
    transmitting, in the first sector, data signals on unassigned PRBs using the first RAT; and
    reducing transmission power of the control signals and the data signals on an unassigned PRB using the first RAT if the unassigned PRB is scheduled for transmission relatively closer to the assigned PRB than other unassigned PRBs.

12. The method of claim 11, further comprising:
determining that the at least one assigned PRB is not used for transmission using the second RAT; and
transmitting over the at least one assigned PRB using the first RAT based on the determining.

13. A method for allocating resources of a frequency band in a wireless system supporting a first radio access technology (RAT) and a second RAT operating in a narrower frequency band than the first RAT, the method comprising:
assigning at least one physical resource block (PRB) of a plurality of PRBs of the frequency band to the second RAT, the at least one assigned PRB not including a control channel of the first RAT;
transmitting, in a first sector, over the at least one assigned PRB using the second RAT;
determining whether the at least one assigned PRB is not used for transmission using the second RAT; and
transmitting over the at least one assigned PRB using the first RAT based on the determining, and
the determining is based on a reduction in the number of devices using the second RAT.

14. The method of claim 11, wherein the assigned PRB in the first sector is not used for transmission in a second sector.

15. A method for allocating resources of a frequency band in a wireless system supporting a first radio access technology (RAT) and a second RAT operating in a narrower frequency band than the first RAT, the method comprising:
assigning at least one physical resource block (PRB) of a plurality of PRBs of the frequency band to the second RAT, the at least one assigned PRB not including a control channel of the first RAT;
transmitting, in a first sector, over the at least one assigned PRB using the second RAT; and
transmitting at low power, in a second sector, over the at least one assigned PRB using the first RAT.

16. The method of claim 15, wherein the transmitting at low power transmits to a user equipment that is close to a base station of the second sector.

17. An apparatus for allocating carrier frequencies of a frequency band in a wireless system supporting a first radio access technology (RAT) and a second RAT operating in a narrower frequency band than the first RAT, the apparatus comprising:
a controller, the controller configured to,
assign at least one physical resource block (PRB) of a plurality of PRBs of the frequency band,
transmit, in a first sector, using only the second RAT in the at least one reserved PRB,
transmit, in the first sector, control signals on unassigned PRBs using the first RAT; and
reduce transmission power on at least one of the unassigned PRBs using the first RAT if the unassigned PRB is scheduled for transmission relatively closer to the assigned PRB than other unassigned PRBs.

18. An apparatus for allocating carrier frequencies of a frequency band in a wireless system supporting a first radio access technology (RAT) and a second RAT operating in a narrower frequency band than the first RAT, the apparatus comprising:
a controller, the controller configured to,
assign at least one physical resource block (PRB) of a plurality of PRBs of the frequency band to the second RAT, the at least one assigned PRB not including a control channel of the first RAT,
transmit, in a first sector, using only the second RAT in the at least one assigned PRB,
transmit, in the first sector, data signals on unassigned PRBs using the first RAT, and
reduce transmission power of the control signals and the data signals on an unassigned PRB using the first RAT if the unassigned PRB is scheduled for transmission relatively closer to the assigned PRB than other unassigned PRBs.

* * * * *